(12) United States Patent
Couzis et al.

(10) Patent No.: US 9,034,224 B2
(45) Date of Patent: May 19, 2015

(54) METHOD FOR MAKING POLYAMIDE PARTICLES

(71) Applicant: Research Foundation of The City University of New York, New York, NY (US)

(72) Inventors: Alexander Couzis, Baldwin Place, NY (US); Jeffrey Morris, Bronx, NY (US); Ankur D. Shah, Forest Hills, NY (US); Vilobh Shete, Astoria, NY (US)

(73) Assignee: Research Foundation of The City University Of New York, New York, NY (US)

( * ) Notice: Subject to any disclaimer, the term of this patent is extended or adjusted under 35 U.S.C. 154(b) by 0 days.

(21) Appl. No.: 14/271,561

(22) Filed: May 7, 2014

(65) Prior Publication Data

US 2014/0242386 A1    Aug. 28, 2014

Related U.S. Application Data

(62) Division of application No. 13/504,996, filed as application No. PCT/US2010/055384 on Nov. 4, 2010, now Pat. No. 8,721,937.

(60) Provisional application No. 61/258,083, filed on Nov. 4, 2009.

(51) Int. Cl.
*B01J 2/04* (2006.01)
*B01D 1/18* (2006.01)
*C08G 69/02* (2006.01)
*C08J 3/12* (2006.01)
*C08L 77/02* (2006.01)
*C08L 77/06* (2006.01)

(52) U.S. Cl.
CPC ... *B01D 1/18* (2013.01); *B01J 2/04* (2013.01); *C08G 69/02* (2013.01); *C08J 3/122* (2013.01); *C08J 2377/00* (2013.01); *C08L 77/02* (2013.01); *C08L 77/06* (2013.01)

(58) Field of Classification Search
None
See application file for complete search history.

(56) References Cited

U.S. PATENT DOCUMENTS

| | | | |
|---|---|---|---|
| 3,536,647 A | 10/1970 | Battista et al. | |
| 3,844,991 A | 10/1974 | Ferraro et al. | |
| 3,887,668 A * | 6/1975 | Honjo | 264/14 |
| 4,075,369 A | 2/1978 | Ferraro et al. | |
| 4,146,504 A | 3/1979 | Deffeyes | |
| 6,308,434 B1 | 10/2001 | Chickering et al. | |
| 6,777,488 B1 | 8/2004 | Araki et al. | |
| 2009/0246235 A1 | 10/2009 | Asano et al. | |
| 2009/0263434 A1 | 10/2009 | Shoji et al. | |

* cited by examiner

*Primary Examiner* — Mary F Theisen
(74) *Attorney, Agent, or Firm* — Hoffmann & Baron, LLP

(57) ABSTRACT

This disclosure relates to a method of preparing polyamide particles. The method include spray drying a solution containing a polyamide to form polyamide particles having an average diameter of between about 0.5 μm and about 10 μm and at least about 85% of the polyamide particles having a diameter distribution of no more than about 1.5 μm.

5 Claims, 2 Drawing Sheets

METHOD FOR MAKING POLYAMIDE PARTICLES

CROSS-REFERENCE TO RELATED APPLICATION

This application is a divisional of U.S. patent application Ser. No. 13/504,996, filed Aug. 31, 2012, which asserts priority to an International Application filed under the Patent Cooperation Treaty, PCT/US2010/055384, filed on Nov. 4, 2010, which claims priority to U.S. Patent Application No. 61/258,083, filed Nov. 4, 2009, the contents of which are incorporated herein by reference.

TECHNICAL FIELD

This disclosure relates to a method of making polyamide particles, as well as related apparatus, compositions, and products.

BACKGROUND

Polymeric microparticles (e.g., micron and sub-micron particles) have attracted increased attention over the past several years. Compared to conventional bulk polymeric structures, polymeric microparticles can have improved mechanical strength, and greater control of transport properties, material property adjustability, and dimensional stability. Because of these properties, polymeric microparticles are useful in a variety of applications such as, catalysts, coatings, controlled release formulations for pharmaceuticals, biostructural fillers, electronics devices, and polymeric composites.

In addition, hydrophilic polymer microparticles and, in particular, polyamide (PA) microparticles, typically have a greatly enhanced water absorption capacity compared to their bulk counterparts. For example, although the water absorption of bulk nylon fibers is only 10% by weight, nylon microparticles provide both improved water absorbing ability, as well as spill and wear resistance, due to their greatly increased surface area and the accessibility of water to their submicron void.

Polymers are a family of important synthetic materials, which have broad applications in biology, chemistry, medicine and engineering, including their use as fibers, plastics, and coatings. These products are useful but can be further improved by controlling the formation of polymeric nanostructures thereof. There is a continuing need for improved methods for the preparation of polymeric microparticles that are cost-effective, and amenable to synthesis on an industrial scale. In particular, there is a need for methods that allow for bulk polymeric materials to be converted to their corresponding polymeric microparticles using simple and energy-efficient method and apparatus.

SUMMARY

This disclosure is based on the unexpected discovery that a spray drying process can be used to prepare polyamide (e.g., nylon-6) particles with small particle size (e.g., from about 0.5 μm and about 10 μm) and having a narrow size distribution. The particles thus obtained can be used in a wide variety of applications, such as abrasive materials, catalysts, coatings, controlled release formulations for pharmaceuticals, electronics devices, and polymeric composites. The spray drying process can reduce the energy consumption at least by 50% compared to the known powder forming processes and produces negligible waste when designed as a closed loop process.

In one aspect, the disclosure features a method that includes spray drying a solution containing a polyamide to form polyamide particles having an average diameter of between about 0.5 μm and about 10 μm and at least about 85% of the polyamide particles having a diameter distribution of no more than about 1.5 μm.

In another aspect, the disclosure features a method that includes (1) spraying a solution containing between about 1 wt % and about 8 wt % of a polyamide to form a plurality of droplets; and (2) drying the droplets by an inert gas (e.g., nitrogen) having a temperature between about 140° C. and about 210° C. to form polyamide particles.

In still another aspect, the disclosure features a composition that includes polyamide particles having an average diameter of between about 0.5 μm and about 10 μm (e.g., between about 0.5 μm and about 4 μm) and at least about 85% (e.g., at least about 90%) of the polyamide particles having a diameter distribution of no more than about 1.5 μm.

Embodiments can include one or more of the following optional features.

The polyamide can include a nylon (e.g., nylon-6, nylon-11, nylon-12, nylon-6,6, nylon-6,9, nylon-6,10, nylon-6,12, or a mixture thereof).

The solution can further include a solvent (e.g., a solvent having a boiling point less than about 120° C.). Exemplary solvents include formic acid, dichloromethane, or a mixture thereof.

The polyamide can be about 1 wt % to about 8 wt % of the solution.

The spraying drying can include spraying the solution to form a plurality of droplets having an average diameter of from about 5 μm to about 30 μm. The solution can be sprayed through at least one nozzle (e.g., a high pressure nozzle, a spinning disk, or a piezoelectric nozzle).

The spray drying can further include drying the droplets to form the polyamide particles. In some embodiments, the drying can include mixing the droplets with an inert gas having a temperature of between 140° C. and about 210° C. In some embodiments, the drying can be performed in an evaporation chamber in the shape of a column, the solution and inert gas can be introduced at the top of the evaporation chamber, and the polyamide particles can be collected at the bottom of the evaporation chamber.

The inert gas can have a temperature of between about 140° C. and about 190° C. (e.g., between about 170° C. and about 175° C.) when introduced into the evaporation chamber. In such embodiments, the inert gas can have a temperature of between about 50° C. and about 100° C. at the bottom of the evaporation chamber, the polyamide can be about 1 wt % to about 6 wt % of the solution, and the polyamide particles can have a porosity of from about 0% to about 55%.

The inert gas can also have a temperature of between about 175° C. and about 210° C. (e.g., between about 190° C. and about 200° C.) when introduced into the evaporation chamber. In such embodiments, the inert gas has a temperature of between about 50° C. and about 100° C. at the bottom of the evaporation chamber, the polyamide can be about 4 wt % to about 6 wt % of the solution, and the polyamide particles can have a porosity of from about 45% to about 85%.

Embodiments can provide one or more of the following advantages.

Without wishing to be bound by theory, it is believed that, when the inert gas and solvent are recycled during the process described above, the process produces negligible waste, which is environmentally friendly and significantly reduces the manufacturing costs. Further, without wishing to be bound theory, it is believed that the process described above can use at least about 50% less energy to produce one pound of polyamide particles than the most economical known method (i.e., cryogenic grinding).

Other features and advantages of the invention will be apparent from the description, drawings, and claims.

DETAILED DESCRIPTION

This disclosure generally relates to using a spray drying process to prepare polyamide (e.g., nylon-6) particles with smaller particle size (e.g., from about 0.5 μm and about 10 μm) and having a narrow size distribution. In general, the process includes spraying a solution containing a polyamide (e.g., having a concentration of between about 1 wt % and about 8 wt %) to form a plurality of droplets, and drying the droplets by an inert gas (e.g., having a temperature between about 140° C. and about 210° C.) to form polyamide particles.

Figure 1:
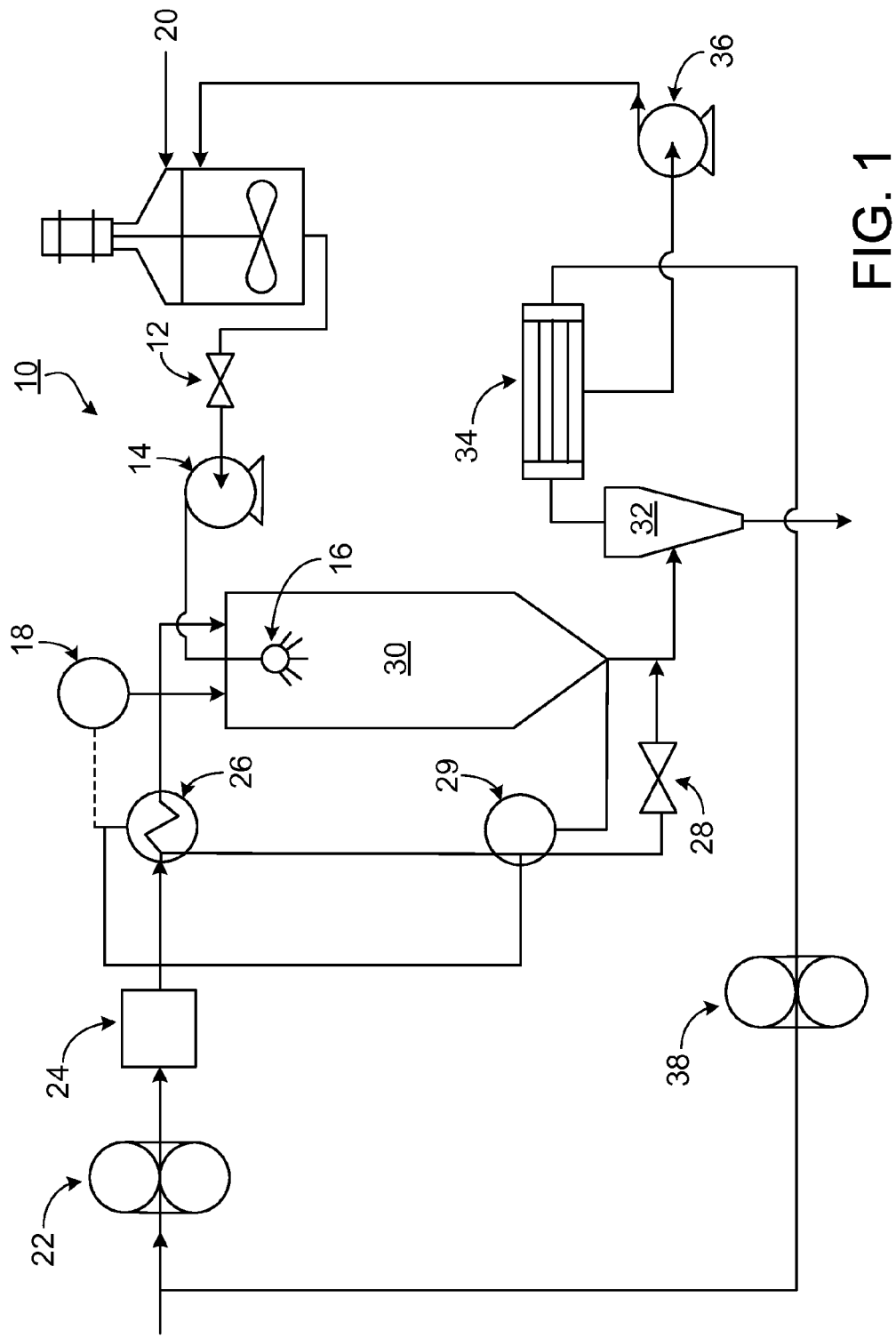
FIG. 1 is a scheme illustrating an exemplary spray drying process for making polyamide particles.

FIG. 1 is a scheme illustrating an exemplary spray drying process for making the polyamide particles described above using a closed loop system 10. System 10 includes a loading vessel 20, a valve 12, pumps 14 and 36, a spray nozzle 16, thermocouples 18 and 29, gas blowers 22 and 38, a filter 24, a heater 26, an optional supplemental dry inert gas valve 28, an evaporation chamber 30, a cyclone device 32, and a condenser 34. A commercial example similar to system 10 is available from Alaqua Inc. (Guttenberg, N.J.).

As shown in FIG. 1, a solution containing a polyamide and a suitable solvent (e.g., a suitable organic solvent) is introduced into loading vessel 20. This step can be performed either continuously or by a batch-by-batch process. Typically, the polyamide is completely dissolved in the solvent before the solution is introduced into loading vessel 20.

Examples of suitable polyamides that can be used in the spray drying process include nylons, such as nylon-6, nylon-11, nylon-12, nylon-6,6, nylon-6,9, nylon-6,10, nylon-6,12, or a mixture thereof. In some embodiments, a mixture of nylons can be used to prepare particles have a core and a sheath, in which the core includes one type of nylon (e.g., nylon-6 or nylon-6,6) and the sheath includes another type of nylon (e.g., nylon-11 or nylon-12).

Examples of suitable solvents include formic acid, dichloromethane, and a mixture thereof. For example, a suitable solvent for nylon-6 can be formic acid and a suitable solvent for nylon-11 or nylon-12 can be a mixture of formic acid and dichloromethane. When the solvent includes a mixture formic acid and dichloromethane, the solvent can include at most about 99 wt % (e.g., at most about 90 wt %, at most about 80 wt %, at most about 70% or at most about 60 wt %) and/or at least about 10 wt % (e.g., at least about 20 wt %, at least about 30 wt %, at least about 40 wt %, or at least about 50 wt %) of formic acid. As spray drying system 10 is a closed loop system, the weight ratio of the mixture recovered from the spray drying process can be substantially the same as that in the initial mixture used to dissolve the polyamide.

Typically, the solvent used in the spray drying process described herein has a boiling point of less than about 120° C. (e.g., less than about 110° C., less than about 100° C., less than about 90° C., less than about 80° C., or less than about 70° C.) under atmospheric pressure. Without wishing to be bound by theory, it is believed that a solvent having a relatively low boiling point can be separated from the polyamide easily and therefore can facilitate the drying process. In addition, such a solvent can be separated from the polyamide by using less energy than solvents with higher boiling points and therefore can reduce the manufacturing costs.

In some embodiments, the solvent can be heated to an elevated temperature to ensure that the polyamide is completely dissolved in the solvent. For example, the solvent can be heated at a temperature of at least about 30° C. (e.g., at least about 40° C., at least about 50° C., or at least about 60° C.) and/or at most about 80° C. (e.g., at most about 70° C., at most about 60° C., or at most about 50° C.).

In general, the concentration of the polyamide in the solution described above depends on the desired properties of the polyamide particles. In some embodiments, the polyamide concentration can range between at least about 1 wt % (e.g., at least about 2 wt % at least about 3 wt %, or at least about 4 wt %) and at most about 8 wt % (e.g., at most about 7 wt %, at most about 6 wt %, or at most about 5 wt %). Without wishing to be bound by theory, it is believed that increasing the polyamide concentration in the solution described above results in polyamide particles with increased particle size. Further, without wishing to be bound by theory, it is believed that a solution containing a relatively low polyamide concentration can result in polyamide particles with a relatively high density and low porosity. For example, a solution containing from about 1 wt % to about 4 wt % polyamide can result in polyamide particles with a high density and low porosity (i.e., hard particles), while a solution containing from about 4 wt % to about 8 wt % (e.g., from about 4 wt % to about 5 wt %) polyamide can result in polyamide particles with a low density and high porosity (i.e., fluffy particles).

After the solution is introduced into loading vessel 20, it can be delivered to at least one nozzle 16 in evaporation chamber 30 through valve 12 by using pump 14. The solution can then be sprayed into evaporation chamber 30 through nozzle 16 to form a plurality of liquid droplets having a diameter ranging from about 5 μm to about 30 μm. Nozzle 16 can be a high pressure spray nozzle, a spinning disk, or a piezoelectric spray nozzle. Without wishing to be bound by theory, it is believed that using a piezoelectric spray nozzle can increase the production rate of the spray drying process. Evaporation chamber 30 can be in the shape of a column or can be in any other suitable shape.

At about the same time or shortly before the polyamide solution is sprayed into evaporation chamber 30, an inert gas at an elevated temperature can be introduced into evaporation chamber 30 through a gas inlet. Examples of inert gases suitable for the spray drying process described herein include nitrogen, helium, argon, and combinations thereof. Specifically, the inert gas can be first delivered from gas blower 22 to filter 24, where the dust particles in the gas are removed by filtration. In some embodiments, when a high quality inert gas (e.g., without containing any significant amount of dust particles) is used, filter 24 can be omitted from system 10. The inert gas can then be delivered to heater 26 to be heated at a desired initial temperature, which can be measured by thermocouple 18. The initial temperature can be at least about 140° C. (e.g., at least about 145° C., at least about 150° C., at least about 160° C., at least about 170° C., or at least about 175° C.) and/or at most about 210° C. (e.g., at most about 200° C., at most about 190° C., at most about 180° C., or at most about 175° C.). Without wishing to be bound by theory, it is believed that using an inert gas having an initial temperature of about 140° C. to about 190° C. (e.g., from about 145° C. to about 190° C. or from about 170° C. to about 175° C.) can result in polyamide particles with a high density and low porosity (i.e., hard particles), while using an inert gas having an initial temperature of about 175° C. to about 210° C. (e.g., from about 190° C. to about 200° C.) can result in polyamide particles with a low density and high porosity (i.e., fluffy particles). Typically, the inert gas is dry, i.e., having a moisture content less than about 1 wt % (e.g., less than about 0.5 wt %, less than about 0.1 wt %, or less than about 0.05 wt %).

After the polyamide solution is sprayed into evaporation chamber 30, the liquid droplets thus formed can be dried by heating with the inert gas while moving toward the bottom of evaporation chamber 30. Specifically, heat transfer occurs during this process such that the inert gas cools down, while the solvent in the liquid droplets is evaporated into the gas phase, thereby forming polyamide particles. Optionally, evaporation chamber 30 can be surrounded by an insulating material (e.g., aluminum foil) to maintain a temperature gradient within evaporation chamber 30 and to facilitate the heat transfer process. Typically, the inert gas has a sufficiently high temperature (e.g., from about 50° C. to about 100° C.) at the bottom of evaporation chamber 30, which can be measured by thermocouple 29. The polyamide particles at the bottom of evaporation chamber 30 can be either completely dry or partially dry.

The mixture exiting evaporation chamber 30 (i.e., containing the inert gas, the polyamide particles, and the solvent in either the gas state or the liquid state) can then be delivered to cyclone device 32 (such as a device having the shape of an upside down cone). Optionally, an additional stream of the inert gas can be mixed with the mixture above through supplemental dry gas valve 28 before the mixture is fed into cyclone device 32 to ensure that the polyamide particles is dried completely in cyclone device 32. The additional stream is either not heated or can be heated to a temperature (i.e., from about 50° C. to about 100° C.) similar to the mixture exiting evaporation chamber 32. The mixture can be delivered into cyclone device 32 from one side of the cone such that the dried polyamide particles collide with the other side of cone and then move toward the bottom of the device. The polyamide particles can then exit cyclone device 32 and then be collected in suitable packages (e.g., polyethylene bags) by using a packaging system (not shown in FIG. 1). The gas phase in the mixture can be delivered (e.g., from the top of cyclone device 32) to condenser 34 (e.g., having a temperature of about −5° C.) where the solvent vapor is cooled down to the liquid state and is separated from the inert gas. The liquid solvent can then be recycled (e.g., delivered to loading vessel 20 or used to dissolve the polyamide to form the polyamide solution) by using pump 36. The inert gas can be recycled (e.g., delivered to gas blower 32) by using gas blower 38.

Without wishing to be bound by theory, it is believed that, because system 10 allows the inert gas and solvent to be recycled, the process described above produces negligible waste, which is environmentally friend and significantly reduces the manufacturing costs. Further, without wishing to be bound theory, it is believed that the process described above uses at least about 50% less energy to produce one pound of polyamide particles than the most economical known method (i.e., cryogenic grinding). For example, the process described above can use at most about 2,500 BTU to produce one pound of nylon-6 particles, while it is believed that cryogenic grinding uses at least about 5,000 BTU to produce one pound of nylon-6 particles. In addition, without wishing to be bound by theory, it is believed that the process described above can readily control the properties (e.g., the size, morphology, and/or density) of the resultant polyamide particles.

The polyamide particles prepared by the process above can have a unique average diameter and/or a unique diameter distribution. In some embodiments, the polyamide particles can have an average diameter of at most about 10 μm (e.g., at most about 8 μm, at most about 6 m, at most about 4 μm, at most about 3.5 μm, at most about 2.5 μm, at most about 2.0 μm, or at most about 1.5 μm) or at least about 0.5 μm (e.g., at least about 1 μm, at least about 2 μm, or at least about 3 μm). In some embodiments, at least about 85% (e.g., at least about 90% or at least about 95%) of the polyamide particles have a diameter distribution of no more than about 1.5 μm (e.g., no more than about 1.0 μm or no more than about 0.5 μm). In other words, at least about 85% of the polyamide particles have diameters different from each other by no more than about 1.5 μm. For example, at least about 85% (e.g., at least about 87%, at least about 89%, at least about 90%, at least about 92%, at least about 94%, or at least about 95%) of the polyamide particles can have a diameter between 0.5 μm and 2.0 μm. Without wishing to be bound by theory, it is believed that the polyamide particles having the size and/or size distribution described above can be used to form a dispersion with superior stability.

In some embodiments, when the solution has a polyamide concentration of about 1-6 wt % (e.g., about 1-4 wt %) and the inert gas has an initial temperature of about 140-190° C. (e.g., about 145-175° C.), the process described above can be used to prepare polyamide particles with a high density and a low porosity. In such embodiments, the polyamide particles can have a porosity of at least about 0% (e.g., at least about 5%, at least about 10%, at least about 15%, or at least about 20%) and/or at most about 55% (e.g., at most about 50%, at most about 45%, at most about 40%, or at most about 35%). In addition, such polyamide particles can have a density of at least about 0.4 g/m$^3$ (e.g., at least about 0.45 g/m$^3$ or at least about 0.5 g/m$^3$) and/or at most about 0.6 g/m$^3$ (e.g., at most about 0.55 g/m$^3$ or at most about 0.5 g/m$^3$).

In some embodiments, when the solution has a polyamide concentration of about 4-8 wt % (e.g., about 4-6 wt % or about 4-5 wt %) and the inert gas has an initial temperature of about 175-210° C. (e.g., about 190-200° C.), the process described above can be used to prepare polyamide particles with a low density and a high porosity. In such embodiments, the polyamide particles can have a porosity of at least about 45% (e.g., at least about 50%, at least about 55%, at least about 60%, or at least about 65%) and/or at most about 85% (e.g., at most about 80%, at most about 75%, at most about 70%, or at most about 65%). In addition, such polyamide particles can have a density of at least about 0.1 g/m$^3$ (e.g., at least about 0.15 g/m$^3$, at least about 0.2 g/m$^3$, at least about 0.25 g/m$^3$, or at least about 0.3 g/m$^3$) and/or at most about 0.4 g/m$^3$ (e.g., at most about 0.35 g/m$^3$, at most about 0.3 g/m$^3$, at most about 0.25 g/m$^3$, or at most about 0.2 g/m$^3$).

The polyamide particles described herein can be used in a wide variety of products, such as abrasive materials, catalysts, coatings, controlled release formulations for pharmaceuticals, electronics devices, and polymeric composites.

While certain embodiments are described above, other embodiments can also be used to prepare polymer particles. For example, system 10 described above can be replaced with an open loop system in which the solvent and/or inert gas are either partially recycled or not recycled.

The skilled artisan will appreciate that the numerical values presented herein are approximate values. Generally, unless otherwise indicated, terms such as "about" and "approximately" include within 20% of the values indicated.

The contents of all publications cited herein (e.g., patents, patent application publications, and articles) are hereby incorporated by reference in their entirety.

The following example is illustrative and not intended to be limiting.

Example 1

Preparation of Nylon-6 Particles Using a 3 wt % Solution in Formic Acid

Nylon-6 particles were prepared as follows using a system similar to that shown in FIG. 1: Nylon-6 was first dissolved in 99% formic acid to form a 3 wt % solution (which contained about 3.56 mg of nylon-6 per 100 ml of formic acid). The solution was then delivered to a loading vessel of a Yamato ADL311S spray drying system coupled with a GAS410 solvent recovery system (available from Yamato Scientific America, Inc., Santa Clara, Calif.). The solution was sent to a high pressure nozzle in an evaporation chamber through a valve by using a pump. The flow rate of the solution was 10 ml/minute. At about the same time or shortly before the solution was sprayed into evaporation chamber through the nozzle, a gas blower delivers a stream of nitrogen under the pressure of 100 KPa at a flow rate of 0.5 m$^3$/minute to a heater, where the nitrogen was heated to an elevated temperature. The nitrogen was then introduced into the evaporation chamber through a gas inlet. The inlet temperature of the nitrogen was about 145° C. The above nylon-6 solution was sprayed into the evaporation chamber through the nozzle to form a plurality of liquid droplets, which were dried by the nitrogen while moving to the bottom of the evaporation chamber. At the outlet of the evaporation chamber, the nitrogen has a temperature ranging from 65-75° C. The mixture exiting the evaporation chamber was fed into a cyclone device, where the nylon-6 particles were separated and collected at the bottom of the cyclone device and the nitrogen and formic acid vapor were fed to a condenser. The formic acid vapor was then cooled in the condenser to its liquid state and was recycled.

Figure 2:
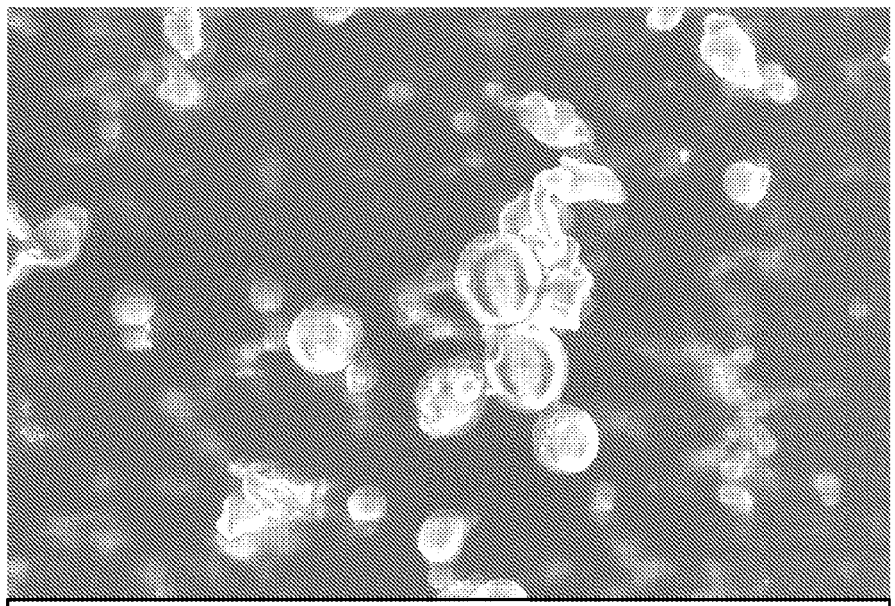
FIG. 2 is an exemplary SEM image of nylon-6 particles prepared by using a 3 wt % solution in formic acid.

The particles obtained above were analyzed by using a Scanning Electron Micrograph (SEM) to determine their sizes and shape. An exemplary SEM image is shown in FIG. 2. The SEM results showed that the nylon-6 particles appeared to have a uniform round shape with a smooth surface texture. No fiber was found in the nylon-6 particles. In addition, SEM analysis determined that 89.0% of the particles had a diameter between 0.5 and 2 µm, 6.0% of the particles had a diameter smaller than 0.5 µm, and 5.0% of the particles had a diameter greater than 2 µm.

The particles obtained above were also analyzed by using thermal gravimetric analysis. The results showed that the particles had a melting point of 212.5° C. and contained 6.2 wt % residual formic acid.

Example 2

Preparation of Nylon-6 Particles Using a 1 wt % Solution in Formic Acid

Nylon-6 particles were prepared following the procedure described Example 1 except that the concentration of nylon-6 in the solution was adjusted from 3 wt % to 1 wt % and that the temperature of the nitrogen at the gas inlet of the evaporation chamber was adjusted from 145° C. to 140° C.

Figure 3:
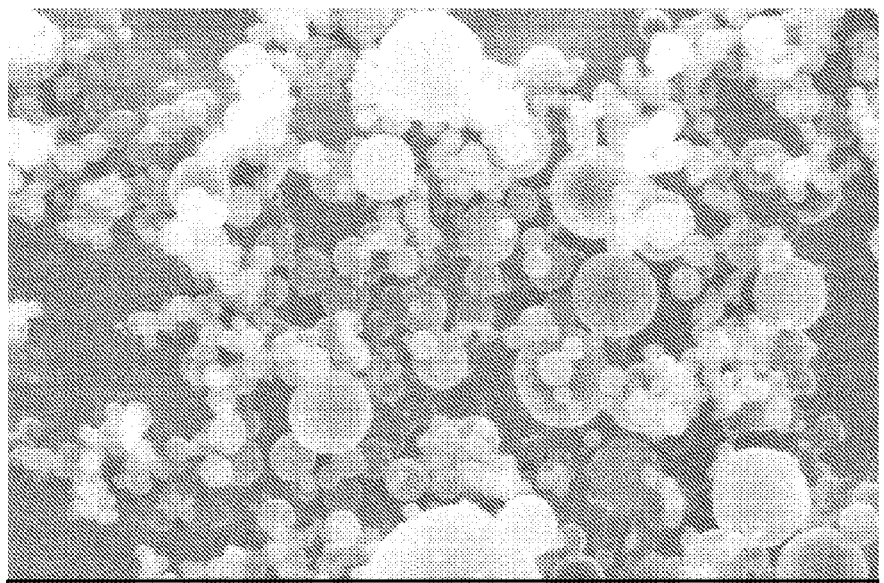
FIG. 3 is an exemplary SEM image of nylon-6 particles prepared by using a 1 wt % solution in formic acid.

The nylon-6 particles obtained above were analyzed by using a SEM to determine their sizes and shape. An exemplary SEM image is shown in FIG. 3. The SEM results showed that the nylon-6 particles appeared to have a uniform round shape with a smooth surface texture. No fiber was found in the nylon-6 particles. In addition, SEM analysis determined that 92.5% of the particles had a diameter between 0.5 and 2 µm, 1.6% of the particles had a diameter smaller than 0.5 µm, and 5.9% of the particles had a diameter greater than 2 µm.

The particles obtained above were also analyzed by using thermal gravimetric analysis. The results showed that the particles had a melting point of 212.5° C. and contained 6.0 wt % residual formic acid.

Other embodiments are in the claims.

What is claimed is:

1. A method, comprising:
   spraying a solution comprising between about 1 wt % and about 8 wt % of a polyamide to form a plurality of droplets; and
   drying the droplets by an inert gas having a temperature between about 140° C. and about 210° C. to form polyamide particles.

2. The method of claim 1, wherein the solution further comprises a solvent, the solvent comprising formic acid, dichloromethane, or a mixture thereof.

3. The method of claim 2, wherein the solution comprises between about 1 wt % and about 6 wt % of the polyamide.

4. The method of claim 3, wherein the temperature is between about 140° C. and about 190° C.

5. The method of claim 3, wherein the temperature is between about 175° C. and about 210° C.

* * * * *